June 29, 1926.

A. N. MERLE 1,590,770

DEVICE FOR PHOTOGRAPHING TITLES UPON CINEMATOGRAPHIC FILMS

Filed Jan. 17, 1925

André Noël Merle
INVENTOR:
By
his ATTORNEY

Patented June 29, 1926.

1,590,770

UNITED STATES PATENT OFFICE.

ANDRÉ NOËL MERLE, OF PARIS, FRANCE, ASSIGNOR TO PATHE CINEMA ANCIENS ETABLISSEMENTS PATHE FRERES, OF PARIS, FRANCE.

DEVICE FOR PHOTOGRAPHING TITLES UPON CINEMATOGRAPHIC FILMS.

Application filed January 17, 1925, Serial No. 2,970, and in France February 2, 1924.

When titles are to be provided upon a cinematographic film, the titles are photographed upon separate strips which are then interposed in the film and cemented to the same. This result can be obtained with facility in the studio, the operator photographs, between each scene, a suitable panel upon which the title of the scene has been inscribed. But when taking views in the field, this method cannot be employed, and this is particularly the case for amateur work, so that a simple device of a portable nature becomes necessary.

The present invention relates to a portable device of a simple character whereby the titles may be photographed in their proper place upon the film during the view-taking operation, it being chiefly characterized by the fact that it comprises a small screen of ground glass, celluloid or like translucent material upon which the titles to be photographed may be inscribed, and a suitable collar for securing the device to the lens of the cinematographic camera; said screen may be folded down and thus removed from the field of the lens while the views are being taken.

The titles which are thus photographed during the taking of views will appear after development in their proper place and can be suitably projected upon the screen. This method will greatly simplify the work required of the amateur.

In the appended drawing which shows by way of example an embodiment of the invention:

1 is the main body of the device. At one end of the same is pivoted a support or frame 4 containing a small screen of ground glass, celluloid or like translucent material. To the other end of the said main body is pivoted an attaching collar whereby the said device may be mounted upon the lens of the cinematographic camera, said collar being secured in position by means of the set screw 3. To the said main body 1 may also be secured the portrait hood 6 in order to obviate all risk of misplacing the same when it is not employed with the apparatus.

Figure 1:
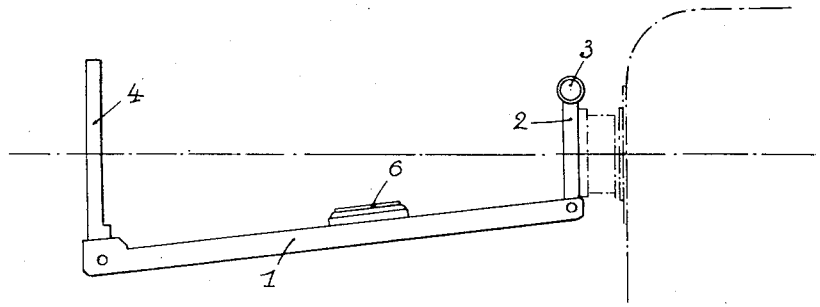
Fig. 1 is an elevational view of the device according to the invention mounted upon a cinematographic camera and in the operative position.
Figure 2:
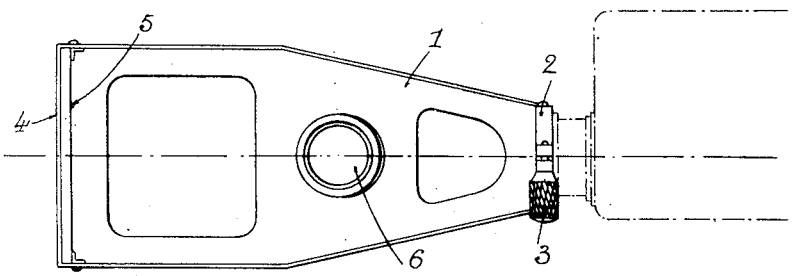
Fig. 2 is the corresponding plan view.
Figure 3:
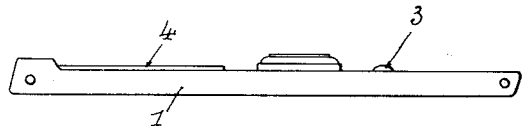
Fig. 3 is an elevational view of the device in the inoperative position.
Figure 4:
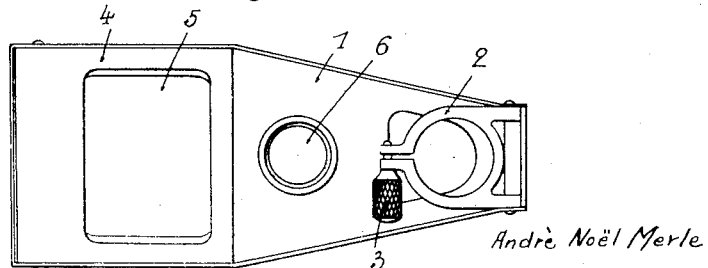
Fig. 4 is a plan view corresponding to Fig. 3.

In order to use the said device, it is mounted upon the camera as shown in Fig. 1, the support 4 being folded down upon the main body 1 as shown in Figs. 3 and 4 so that it will offer no obstacle to the taking of the views.

When a title is to be photographed, the frame 4 with the screen 5 is raised, Fig. 1, and the title is inscribed upon the said screen. The operator then turns the operating handle of the camera; the number of images formed will depend upon the number of turns of the operating handle.

When the said device is not mounted upon the camera, it may be folded down as shown in Figs. 3 and 4, thus occupying the minimum space, and it may be readily stowed in the sack together with the camera.

Having now described my said invention, I declare that what I claim and desire to secure by Letters Patent is:

1. A device for photographing titles upon a film in place in a cinematographic camera provided with a lens comprising a flat shelf removably secured to an exterior part of the cinematogrophic camera in a substantially horizontal position before the lens and a screen on which are inscribed the titles to be photographed hinged upon said flat shelf in such manner that the screen, when in vertical position, is in the field of the lens and, when folded down on said flat shelf, is out of the field of the lens and is then adapted to be used as a desk to inscribed the titles to be photographed.

2. A device for photographing titles upon a film in place in a cinematographic camera provided with a lens comprising a flat shelf removably secured to an exterior part of the cinematographic camera in a substantially horizontal position before the lens, a screen on which are inscribed the titles to be photographed and a frame adapted to hold said screen and hinged upon said flat shelf in such manner that the screen, when in vertical position, is in the field of the lens and, when folded down on said flat shelf, is out of the field of the lens and is then adapted to be used as a desk to inscribe the title to be photographed.

In testimony whereof I have signed my name to this specification.

ANDRÉ NOËL MERLE.